US008312069B2

(12) United States Patent
Gemmeke et al.

(10) Patent No.: US 8,312,069 B2
(45) Date of Patent: Nov. 13, 2012

(54) PERMUTE UNIT AND METHOD TO OPERATE A PERMUTE UNIT

(75) Inventors: Tobias Gemmeke, Stutensee (DE); Jens Leenstra, Bondorf (DE); Dieter Wendel, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 1428 days.

(21) Appl. No.: 11/872,811

(22) Filed: Oct. 16, 2007

(65) Prior Publication Data

US 2008/0130871 A1 Jun. 5, 2008

(30) Foreign Application Priority Data

Oct. 17, 2006 (EP) .................................. 06122403

(51) Int. Cl.
*G06F 7/00* (2006.01)
(52) U.S. Cl. ....................................................... 708/200
(58) Field of Classification Search ........................ None
See application file for complete search history.

(56) References Cited

U.S. PATENT DOCUMENTS 7,783,690 B2 * 8/2010 Leenstra et al. .............. 708/200
2005/0149570 A1 * 7/2005 Sasaki et al. ................ 707/104.1

OTHER PUBLICATIONS

Mading, et al., "The Vector Fixed Point Unit of the Synergistic Processor Element of the Cell Architecture Processor", Proceedings of ESSCIRC, Grenoble, France, 2005, pp. 203-206.
IBM Presentation of the "Cell Architecture," Apr. 6, 2006.
B. Flachs et al., "A Streaming Processing Unit for a CELL Processor," 2005 IEEE International Solid-State Circuits Conference, 2005, pp. 134-135.

* cited by examiner

*Primary Examiner* — Tan V. Mai
(74) *Attorney, Agent, or Firm* — Matthew C. Zehrer

(57) ABSTRACT

A permute unit includes permute logic and a crossbar working in cycles defined by clocking signals and generates one valid output vector per cycle by treating two parallel input vectors per cycle. The permute unit is double pumped by performing two inner cycles per outer cycle defined by the clocking signals. In the first inner cycle, first halves of both input vectors are treated. In the second inner cycle, second halves of both input vectors are treated and a valid output vector is generated from the results of the treatments within the first and the second inner cycles.

9 Claims, 4 Drawing Sheets

PERMUTE UNIT AND METHOD TO OPERATE A PERMUTE UNIT

BACKGROUND OF THE INVENTION

The invention relates to a permute unit comprising a permute logic and a crossbar working in cycles defined by clocking signals and generating one valid output vector per cycle by treating two parallel input vectors per cycle according to an adequate scheme, plus a method to operate such a permute unit.

Modern microprocessors suffer a huge power drawback, where power is a combination of static and dynamic contribution; thereby the static contribution is approximately proportional to the silicon areas of a macro.

To reduce area within a microprocessor, i.e., to reduce cost of silicon area and leakage power, double pumping is frequently used. When double pumping is applied to a unit within a microprocessor, it operates twice as fast as the incoming datarate. This is typically achieved in adding additional register boundaries in the middle of a cycle. Assuming doubling of the clock frequency and identical wordlength, such a double pumped unit has twice the throughput of a non-double pumped unit. Hence, such a double pumped unit can replace two non-double pumped units.

An example of a unit within a microprocessor is a vector unit (VMX). Typically VMXs are realized fully parallel, i.e., they operate on a full word-length operand of e.g., 128 bit per cycle. A single-instruction multiple-data (SIMD) VMX, like e.g., the VMX of some IBM PowerPC and POWER processors is well suited for the scheme of double pumping, as N=4 identical computational units, like e.g., integer, floating point and logical unit work in parallel on 32 bit input vectors. Neglecting any overhead for double pumping, half the area and leakage power could be saved by double pumping the computational units within a VMX.

A permute unit allows to perform vector permute operations, in which the bytes of a source operand are reordered in the target output. It is typically reused for other instructions requiring multiplexing or shifting operations, particularly those in which the size of additional multiplexers or the size and delay of a barrel shifter is significant. An example for a permute unit in a vector unit is described in N. Maeding et al "The vector fixed point unit of the synergistic processor element of the cell architecture processor", Proc. of European Solid-State Circuits Conference (ESSCIRC) 2005, pp. 203-206.

However, as the permute unit that is a part of a vector unit operates on the full length of input vectors, i.e., 128 bit, a double pumping scheme is usually not possible.

SUMMARY OF THE INVENTION

It is therefore an object of at least one embodiment of the invention to provide a permute unit that can be double pumped in order to reduce cost as silicon area and power dissipation plus a method to operate such a permute unit. This object is met by a permute unit comprising a permute logic (20) and a crossbar (41) working in cycles defined by clocking signals and generating one valid output vector (vo) per cycle by treating two parallel input vectors (va, vb) per cycle according to an adequate scheme, characterized in that the permute unit (10) is double pumped by performing two inner cycles per outer cycle defined by the clocking signals, wherein in every first inner cycle first halves (va<0:63>, vb<0:63>) of both input vectors (va, vb) are treated and in every second inner cycle second halves (va<64:127>, vb<64:127>) of both input vectors (va, vb) are treated and wherein every second inner cycle a valid output vector (vo) is generated from the results of the treatments within the first and the second inner cycles.

In another embodiment, the invention provides a permute unit comprising a permute logic and a crossbar working in cycles defined by clocking signals and generating one valid output vector per cycle by treating two parallel input vectors per cycle according to an adequate scheme. The permute unit according to the invention is double pumped by performing two inner cycles per outer cycle defined by the clocking signals, wherein in every first inner cycle first halves of both input vectors are treated according to the adequate scheme and in every second inner cycle second halves of both input vectors are treated according to the adequate scheme and wherein every second inner cycle, corresponding to every outer cycle, a valid output vector is generated from the results of the treatments within the first and the second inner cycles.

The permute unit has the advantage over the state of the art, that it can be double pumped with only a small overhead. Compared with the state of the art, the permute unit according to the invention operates on two succeeding halves of (e.g., 64 bit) width of input vectors per inner cycle instead of the full width (e.g., 128 bit) input vectors. Using this approach, the silicon area, which is required for the implementation of the input register forwarding to the input vectors of the permute logic in the permute unit, is cut by a factor of two. Further, the width of the crossbar is cut by two reducing the timing critical path. The width of the output register forwarding the output vector generated by the permute unit remains unchanged (e.g., it still has a width of 128 bit). Overall, silicon area is cut by about a factor of two being equivalent to an approximate reduction in leakage power of a factor of two.

It is evident that the invention is not limited to double pumping, it is also thinkable to quadruple, octuple and so on pumping the permute unit wherein in these cases the parallel input vectors are divided in four, eight and so on parts and in every inner cycle successive pairs of first, second, third and so on fourths, eighths and so on are treated.

A preferred embodiment of the permute unit according to the invention comprises means to successively treat pairs of first and second halves of parallel input vectors according to an adequate scheme in successive inner cycles, in order to process pairs of first and second halves of the parallel input vectors pair by pair. It further comprises means to consider successively treated pairs of halves of the input vectors within every first and second inner cycle when applying the adequate scheme according to which the input vectors are treated. Considering successively treated pairs of halves of the input vectors is necessary since when treating a pair of full width input vectors it happens that bits or bytes within the right halves of the input vectors affect the treatment of the left halves of the input vectors. By said means to consider successively treated pairs of halves of the input vectors this influence is taken into account when treating the second pair of second halves of the input vectors in the second inner cycle. Said preferred embodiment of the permute unit according to the invention also comprises means to generate a valid output vector every second inner cycle corresponding to every outer cycle. This is necessary for generating valid output vectors synchronously to the outer cycles. It further ensures to generate a valid output vector from the results of the treatments in the first and second inner cycle.

According to another preferred embodiment of the permute unit according to the invention, the means to successively treat pairs of first and second halves of parallel input vectors according to an adequate scheme in successive inner cycles comprise at least a double pumped permute logic performing two inner cycles per outer cycle given by the clocking signals. During every first inner cycle a first pair of first halves of parallel input vectors is treated and during every second inner cycle a second pair of second halves of parallel input vectors is treated. Double pumping the permute logic allows to reuse a crossbar of reduced complexity which results in a reduced area requirement accompanied by reduced leakage power and reduced costs.

According to an additional preferred embodiment of the permute unit according to the invention, the means to consider successively treated pairs of halves of the input vectors within every first and second inner cycle when applying the adequate scheme comprise a feedback-loop providing information about the treatment in the first inner cycle to the treatment in the second inner cycle and/or vice versa.

According to an additional preferred embodiment of the permute unit according to the invention, the means to generate a valid output vector every second inner cycle corresponding to every outer cycle comprises a feedback network that delays valid parts of the result of the treatment of every first inner cycle by one inner cycle. The feedback network preferably comprises a connection from an output register to an additional input of the crossbar multiplexer. This way the valid parts of the result of the first inner cycle are supplied for the second inner cycle. This feedback network works as a functional hold for those parts of the result that are selected by the crossbar multiplexer in the second inner cycle. Another preferred embodiment of such functional hold is the preservation of the valid parts of the result of the first inner cycle by clock gating the clock signal of the corresponding registers. This way a 17:1 crossbar multiplexer can be replaced by a 16:1 crossbar multiplexer.

A preferred embodiment of a permute unit according to the invention comprises means to divide pairs of parallel received input vectors into successive pairs of first and second halves. This is advantageous if the permute unit according to the invention is operated in an infrastructure providing parallel input vectors of full width.

According to a preferred embodiment of the invention, the adequate scheme according to which the pairs of first and second halves of the input vectors are treated is affected by e.g., an instruction code plus a third operand vector. The latter is provided to the permute unit in parallel to the parallel input vectors.

In another embodiment, the invention provides a method to operate a double pumped permute unit like mentioned above. The method comprises the steps of: double pumping a permute unit by performing two inner cycles per outer cycle given by a clock signal, treating a first pair of first halves of two parallel input vectors according to an adequate scheme in a first inner cycle, treating a second pair of second halves of two parallel input vectors according to an adequate scheme in a second inner cycle, wherein when treating the second pair the treatment of the first pair is considered, combining the results of the treatment of the first pair and the treatment of the second pair to a valid output vector every second inner cycle. Doing so allows to operate a permute unit described above and using its advantages over the state of the art that are reduced leakage power and reduced costs.

According to a preferred embodiment of the method according to the invention, the parallel input vectors are divided into successive pairs of first and second halves before the first pair of first halves of two parallel input vectors are treated. This step allows to operate a double pumped permute unit in an infrastructure that provides parallel input vectors at full width. If the infrastructure provides the parallel input vectors in the form of first and second pairs of first and second halves, this step can be spared.

The foregoing, together with other objects, features, and advantages of this invention can be better appreciated with reference to the following specification, claims and drawings.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
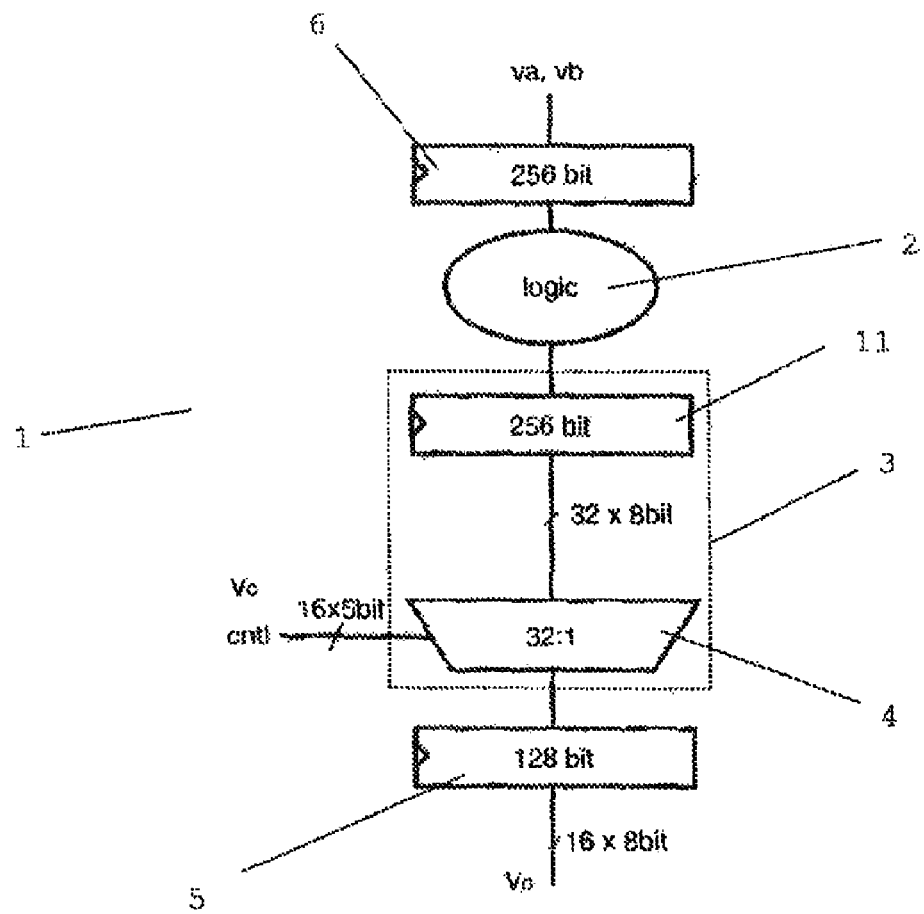
FIG. 1 is a scheme of a permute unit according to the state of the art.

A permute unit 1 according to the state of the art as shown in FIG. 1 comprises a permute logic 2 and a crossbar 3 working in cycles defined by clocking signals. The permute unit 1 generates one valid output vector $v_o$ of 128 bit width per cycle by treating two parallel input vectors $v_a$, $v_b$ per cycle according to an adequate scheme. The two parallel input vectors $v_a$, $v_b$ have full width of 128 bit each, resulting in an input register 6 of 256 bit width and a crossbar 3 of also 256 bit width. The permute unit 1 further comprises a multiplexer 4, an output register 5, an input register 6 and an operand staging latch 11. The multiplexer 4 together with the operand staging latch 11 and corresponding interconnections realizes the crossbar 3, which distributes all thirty-two input bytes to all sixteen output bytes. Sixteen times five control signals trigger each of the sixteen 32:1 multiplexers individually to transfer the proper input byte to the result byte.

Figure 2:
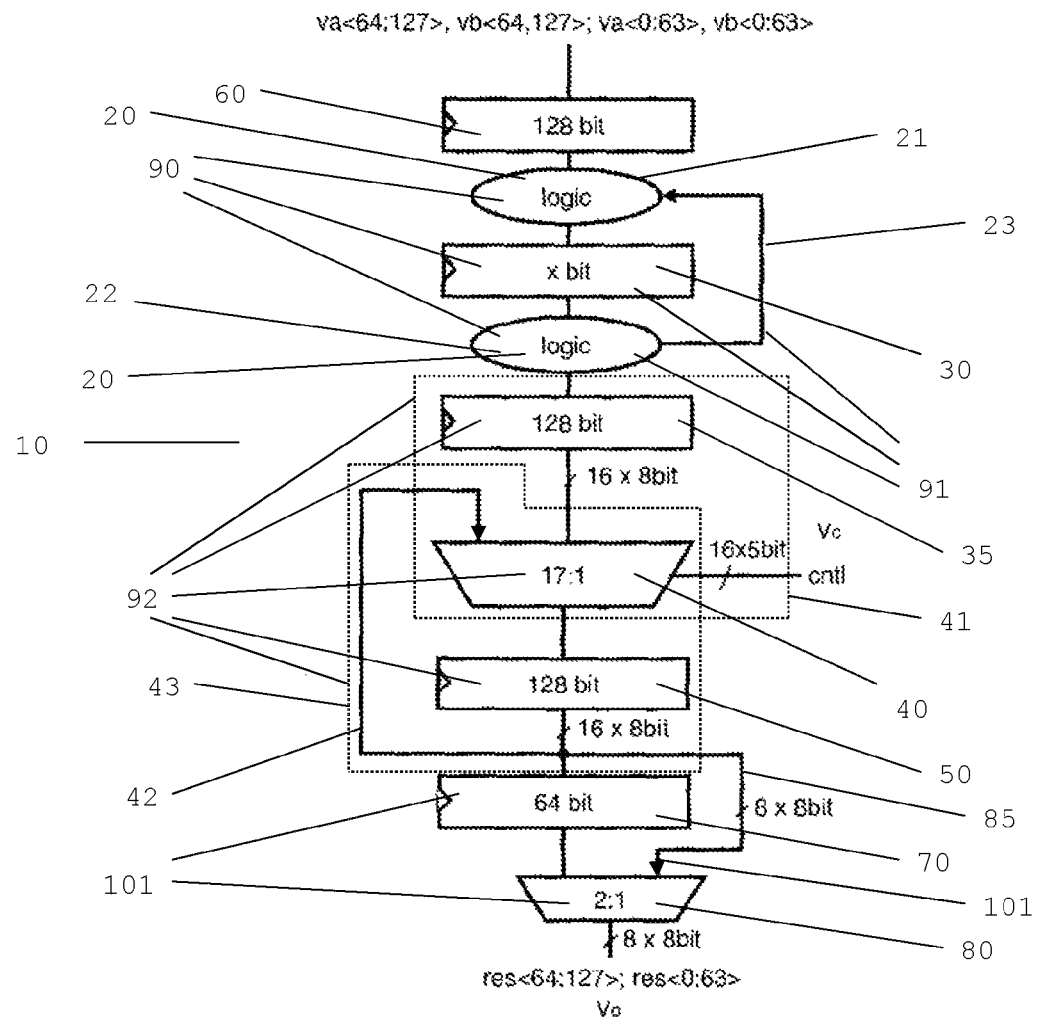
FIG. 2 is a scheme of a double pumped permute unit according to the invention.

FIG. 2 shows a double pumped permute unit 10 according to the invention. The permute unit 10 comprises a permute logic 20 and a crossbar 41. The permute logic 20 consists of two parts, a first one 21 and a second one 22. The double pumped permute unit 10 also generates one valid output vector $v_o$ per cycle defined by clocking signals by treating two parallel input vectors $v_a$, $v_b$ according to an adequate scheme. The permute unit 10 is double pumped by performing two inner cycles per outer cycle defined by the clocking signals. Thereby the input vectors $v_a$, $v_b$ are not treated in their full widths, but in first and second pairs of first and second halves as schematically shown in FIG. 2 by $v_a$<0:63>, $v_b$<0:63> and $v_a$<64:127>, $v_b$<64:127>. In every first inner cycle first halves $v_a$<0:63>, $v_b$<0:63> of both input vectors $v_a$, $v_b$ are treated according to the adequate scheme. In every second inner cycle second halves $v_a$<64:127>, $v_b$<64:127> of both input vectors $v_a$, $v_b$ are treated according to the adequate scheme. Every second inner cycle, corresponding to every outer cycle defined by the clocking signals, a valid output vector $v_o$ is generated from the results of the treatments within the first and the second inner cycles.

Compared with the state of the art, the permute unit 10 operates on 64 bit halves $v_a<0:63>$, $v_b<0:63>$ and $v_a<64:127>$, $v_b<64:127>$ of input vectors $v_a$, $v_b$ per inner cycle instead of full width 128 bit input vectors $v_a$, $v_b$.

Using this approach the silicon area requirement of the input register 60 forwarding the input vectors $v_a$, $v_b$, i.e., their halves $v_a<0:63>$, $v_b<0:63>$ and $v_a<64:127>$, $v_b<64:127>$, to the permute logic 20 of the permute unit 10 is cut by two compared to the state of the art. What is more the width of the crossbar 41 is cut by two reducing the timing critical path. The width of the output register 50 forwarding the output vector generated by the permute unit 10 remains unchanged, i.e., it still has a width of 128 bit. Overall, silicon area is cut by about a factor of two being equivalent to an approximate reduction in leakage power of a factor of two.

To achieve the advantages mentioned above, the permute unit 10 comprises means 90 to successively treat pairs of first $v_a<0:63>$, $v_b<0:63>$ and second $v_a<64:127>$, $v_b<64:127>$ halves of parallel input vectors according to an adequate scheme in successive inner cycles, in order to process pairs of first $v_a<0:63>$, $v_b<0:63>$ and second $v_a<64:127>$, $v_b<64:127>$ halves of the parallel input vectors pair by pair. These means 90 comprise the double pumped permute logic 20 consisting of its two parts 21, 22 performing two inner cycles per outer cycle given by the clocking signals plus the operand staging register 30. Doing so allows re-using the crossbar 41 for two successive cycles which results in a reduced area requirement accompanied by reduced leakage power and reduced costs.

The permute unit 10 further comprises means 91 to consider successively treated pairs of halves $v_a<0:63>$, $v_b<0:63>$ and $v_a<64:127>$, $v_b<64:127>$ of the input vectors within every first and second inner cycle when applying the adequate scheme according to which the input vectors are treated. These means 91 comprise a feedback-loop 23 and the second part 22 of the permute logic 20 arranged at the output of the operand staging register 30. The operand staging register 30 is also part of the means 91. The feedback-loop 23 provides information about the treatment in the first inner cycle to the treatment in the second inner cycle.

Considering successively treated pairs of halves $v_a<0:63>$, $v_b<0:63>$ and $v_a<64:127>$, $v_b<64:127>$ of the input vectors is necessary since when treating a pair of full width input vectors it happens that bits or bytes within the right halves $v_a<0:63>$, $v_b<0:63>$ of the input vectors affect the treatment of the left halves $v_a<64:127>$, $v_b<64:127>$ of the input vectors and/or vice versa. By said means 91 to consider successively treated pairs of halves $v_a<0:63>$, $v_b<0:63>$ and $v_a<64:127>$, $v_b<64:127>$ of the input vectors this influence is taken into account when treating the second pair of second halves $v_a<64:127>$, $v_b<64:127>$ of the input vectors in the second inner cycle.

The permute unit 10 also comprises means 92 to generate a valid output vector every second inner cycle corresponding to every outer cycle. These means 92 comprise a crossbar 41 including an operand staging register 35, a multiplexer 40 and the corresponding interconnections between the operand staging register 35 and the multiplexer 40. The means 92 further comprise a feedback network 43 that includes the multiplexer 40 of the crossbar 41, an output register 50 and a feedback loop 42. This is necessary for generating valid output vectors synchronously to the outer cycles. It further ensures to generate a valid output vector from the results of the treatments in the first and second inner cycle.

If the permute unit 10 is operated in an infrastructure providing full width input vectors $v_a$, $v_b$ it requires means to divide pairs of parallel received input vectors $v_a$, $v_b$ into successive pairs of first $v_a<0:63>$, $v_b<0:63>$ and second halves $v_a<64:127>$, $v_b<64:127>$. The infrastructure in FIG. 2 already provides such halves $v_a<0:63>$, $v_b<0:63>$ and $v_a<64:127>$, $v_b<64:127>$.

To do so, the permute unit 10 comprises means 101 to provide two halves of the result vector in two consecutive cycles. The first half, e.g., right half, of the result vector is directly forward via a feed forward path 85 through an output selection multiplexer 80 to the output vector in the first inner cycle, whereas the second half is delayed by a synchronization register 70 and selected by the output selection multiplexer 80 in the second inner cycle. This way, the permute unit 10 can be used in an infrastructure where the output vector bus is double pumped.

Figure 3:
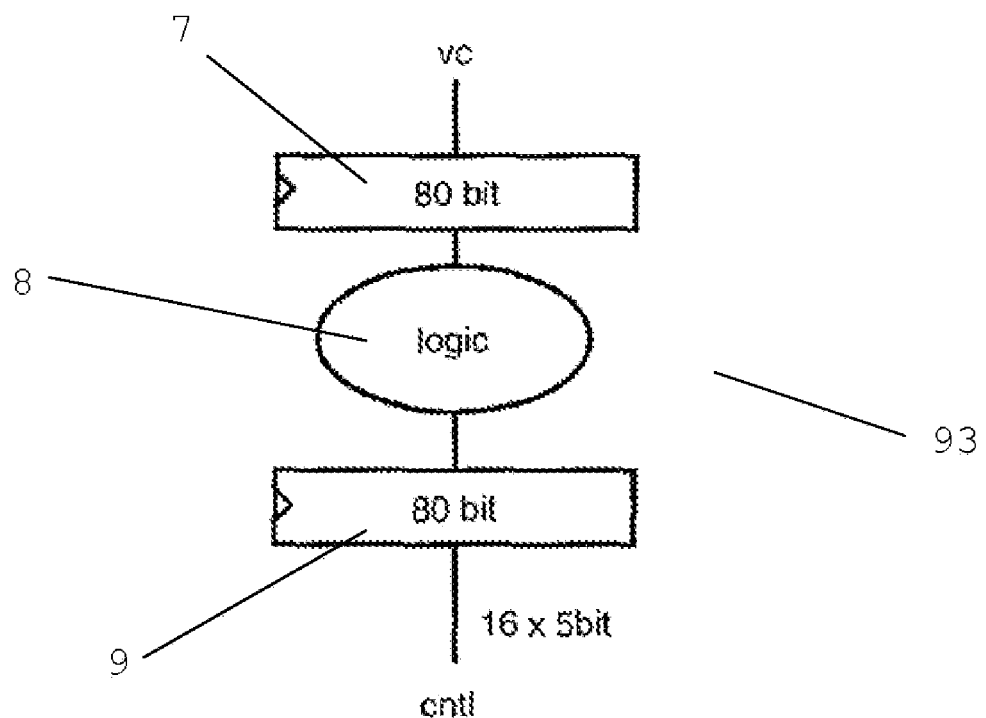
FIG. 3 is a scheme of an arrangement providing an operand vector to a permute unit according to the state of the art, which operand vector affects the adequate scheme according to which the input vectors are treated.
Figure 4:
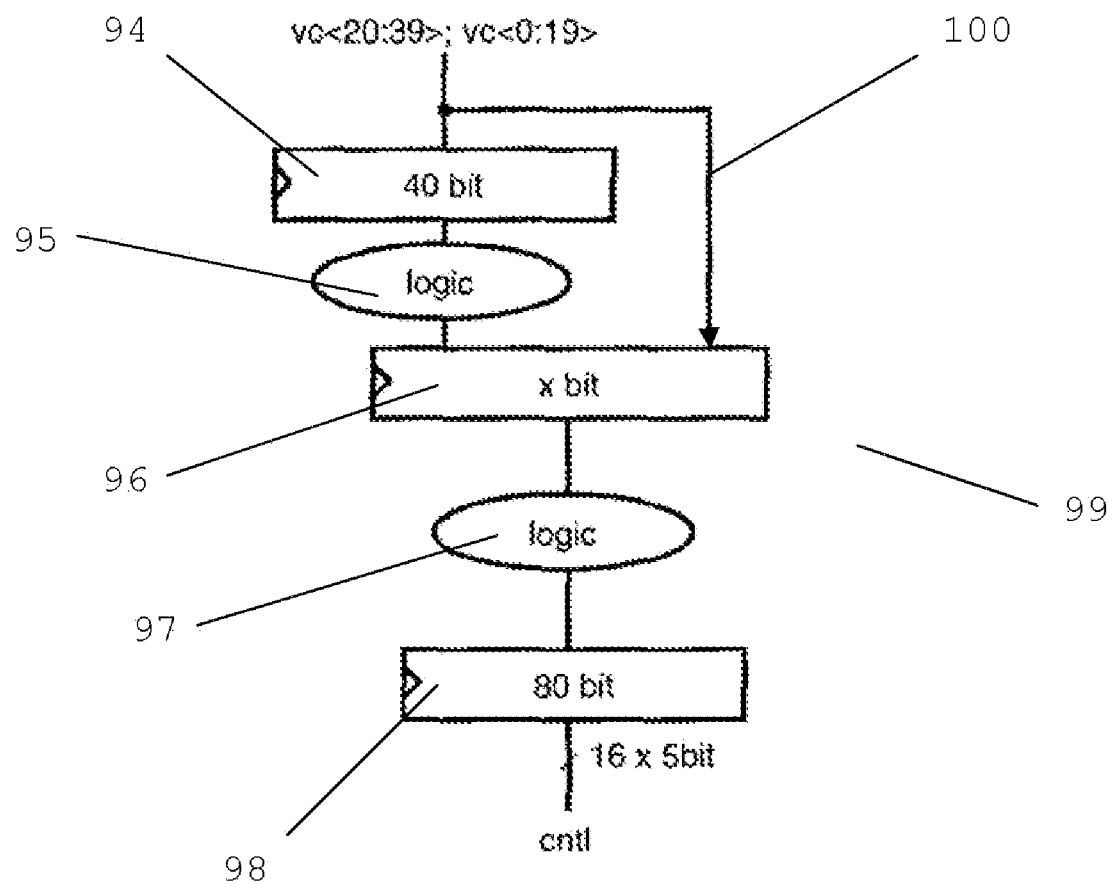
FIG. 4 is a scheme of an arrangement providing an operand vector to a permute unit according to the invention, which operand vector affects the adequate scheme according to which the pairs of first and second halves of the input vectors are treated.

FIGS. 3 and 4 show schemes of arrangements 93, 99 providing an operand vector $v_c$ to a permute unit. The treatment the input vectors $v_a$, $v_b$ are subjected is influenced by the operand vector $v_c$.

Thereby FIG. 3 shows an arrangement 93 according to the state of the art that comprises a control input register 7, a control logic 8, and a control staging register 9. The control logic generates together with the not shown operation code the select signals of the multiplexer 4 of the permute unit 1.

For a permute unit 10 according to the invention, an arrangement 99 as shown in FIG. 4 is required. Forwarding the operand vector $v_c$ to the permute unit 10 has to take place in a way, that the very moment the treatment of the first pair of first halves of the input vectors is performed, the operand vector $v_c$ reaches the permute unit 10. To do so, the arrangement 99 comprises an input control register 94, a control logic first half 95, a control staging register 96, a control logic second half 97, a control staging register 98, and a control forwarding network 100.

However, with a small overhead a permute unit 10 as shown in FIG. 2 can be double pumped. The invention defines such a permute unit 10 that operates on 64 bit input vectors per cycle. The additional circuitry has to overcome the output data dependency on the input vector. For this purpose a feedback loop 23, a control forwarding network 100, and a feedback network 43 is required. The first can be realized by delaying the result of the treatment of the first pair of first halves $v_a<0:63>$, $v_b<0:63>$ of the input vectors within the first inner cycle by one inner cycle. A simple circuit realization comprising the feedback loop 23 and the second part 22 of the permute logic 20 uses the result of the first inner cycle as a feedback for the second inner cycle. Using this approach the input register 60 and the permute logic 20 is cut by two. What is more the width of the crossbar 41 is cut by two reducing the timing critical path. The width of the output register 50 remains unchanged, i.e., 128 bit. The hardware overhead is an equivalent circuit realization of the operand staging register 30, the second part of 22 of the permute logic 20, the input control register 94, the control staging register 96, and the control forwarding network 100.

Overall, silicon area is cut by about a factor of two being equivalent to an approximate reduction in leakage power of a factor of two.

The 17:1 multiplexer 40 in FIG. 2 can also be realized as 16:1 multiplexer with additional functional clock gating. Beside the active logic area reduction another benefit is the potentially reduced width of the crossbar 41 being aligned to the 64 bit datapath of 20 and 21 assuming that the multiplexer 40 and the result latch 50 can be matched to the width of the 64 bit datapath, e.g., by using smaller outline of the corresponding cells.

The realization shown in FIG. 2 is to be used in a double pumped infrastructure, i.e., input vectors $v_a$, $v_b$ and output vectors $v_o$ are supplied in two halves $v_a<0:63>$, $v_b<0:63>$ and $v_a<64:127>$, $v_b<64:127>$ over two consecutive inner cycles.

The realization can be adapted to a non-double pumped input (A) or output (B) infrastructure applying the following changes:

i) (B) removal of the last 2:1 output selection multiplexer 80 and the 64 bit output synchronization register 70. The output is valid every $2^{nd}$ cycle at the last 128 bit register that is the output register 50.

ii) widening the 128b input register to a 256 bit register in the input vector $v_a$ and $v_b$ data path plus adding two 64 bit 2:1 multiplexer that selects the right, also called upper, and left, also called lower, half, also called word of the input vectors $v_a$ and $v_b$. The 128 bit vectors $v_a$ and $v_b$ may only change every second cycle. This can either be enforced on system level, or by clock gating the first 256 bit register. As for the operand vector $v_c$ the input register of 40 bit has to be extended to 80 bit. No multiplexing is required in this case.

It is important to mention that the invention is not limited to double pumping, it is also thinkable to quadruple, octuple and so on pumping the permute unit wherein in these cases the parallel input vectors are divided in four, eight and so on parts and in every inner cycle successive pairs of first, second, third and so on fourths, eighths and so on are treated.

It is further important to mention that the invention is not limited to vectors of 128 bit width. The foregoing as described above will remain the same when treating input vectors of e.g., 64 bit, 256 bit, 512 bit width and generating output vectors of e.g., 64 bit, 256 bit, 512 bit width.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A permute unit comprising: a permute logic and a crossbar working in cycles defined by clocking signals and generating one valid output vector ($v_o$) per cycle by treating two parallel input vectors ($v_a$, $v_b$) per cycle according to an adequate scheme, wherein the permute unit is double pumped by performing two inner cycles per outer cycle defined by the clocking signals, wherein in every first inner cycle first halves ($v_a<0:63>$, $v_b<0:63>$) of both input vectors ($v_a$, $v_b$) are treated and in every second inner cycle second halves ($v_a<64:127>$, $v_b<64:127>$) of both input vectors ($v_a$, $v_b$) are treated and wherein every second inner cycle a valid output vector ($v_o$) is generated from the results of the treatments within the first and the second inner cycles.

2. The permute unit according to claim 1, further comprising:

means for successively treating pairs of halves ($v_a<0:63>$, $v_b<0:63>$, $v_a<64:127>$, $v_b<64:127>$) of parallel input vectors ($v_a$, $v_b$) according to an adequate scheme, means for considering successively treated pairs of halves ($v_a<0:63>$, $v_b<0:63>$, $v_a<64:127>$, $v_b<64:127>$) of the input vectors ($v_a$, $v_b$) when applying the adequate scheme, and means for generating a valid output vector ($v_o$) every second inner cycle.

3. The permute unit according to claim 2, wherein the means for successively treating pairs of halves ($v_a<0:63>$, $v_b<0:63>$, $v_a<64:127>$, $v_b<64:127>$) of parallel input vectors ($v_a$, $v_b$) according to an adequate scheme comprise at least a double pumped permute logic.

4. The permute unit according to claim 3, wherein the means for considering successively treated pairs of halves ($v_a<0:63>$, $v_b<0:63>$, $v_a<64:127>$, $v_b<64:127>$) of the input vectors ($v_a$, $v_b$) when applying the adequate scheme comprise a feedback-loop providing information about the treatment in the first inner cycle to the treatment in the second inner cycle.

5. The permute unit according 4, wherein the means for generating a valid output vector ($v_o$) every second inner cycle comprise a feedback network that delays the result of the treatment of every first inner cycle by one inner cycle.

6. The permute unit according to claim 5, further comprising:

means for dividing pairs of parallel received input vectors into successive pairs of first and second halves.

7. The permute unit according to claim 6, wherein the adequate scheme according to which the pairs of first and second halves of the input vectors are treated is affected by an operand vector ($v_c$) that is provided to the permute unit in parallel to the parallel input vectors ($v_a$, $v_b$).

8. A method to operate a double pumped permute unit comprising:

double pumping a permute unit by performing two inner cycles per outer cycle given by a clock signal, treating, by the permute unit, a first pair of first halves ($v_a<0:63>$, $v_b<0:63>$) of two parallel input vectors ($v_a$, $v_b$) according to an adequate scheme in a first inner cycle, treating, by the permute unit, a second pair of second halves ($v_a<64:127>$, $v_b<64:127>$) of two parallel input vectors ($v_a$, $v_b$) according to an adequate scheme in a second inner cycle, wherein when treating the second pair ($v_a<64:127>$, $v_b<64:127>$) the treatment of the first pair ($v_a<0:63>$, $v_b<0:63>$) is considered, combining, by the permute unit, the results of the treatment of the first pair ($v_a<0:63>$, $v_b<0:63>$) and the treatment of the second pair ($v_a<64:127>$, $v_b<64:127>$) to a valid output vector ($v_o$) every second inner cycle.

9. The method according to claim 8, wherein before the permute unit treats the first pair of first halves ($v_a<0:63>$, $v_b<0:63>$) of two parallel input vectors ($v_a$, $v_b$), the permute unit divides the parallel input vectors into successive pairs of first ($v_a<0:63>$, $v_b<0:63>$) and second halves ($v_a<64:127>$, $v_b<64:127>$).

* * * * *